Sept. 1, 1953　　　H. MICHAELS ET AL　　　2,650,853
RAILWAY CAR WHEEL
Filed Nov. 21, 1950
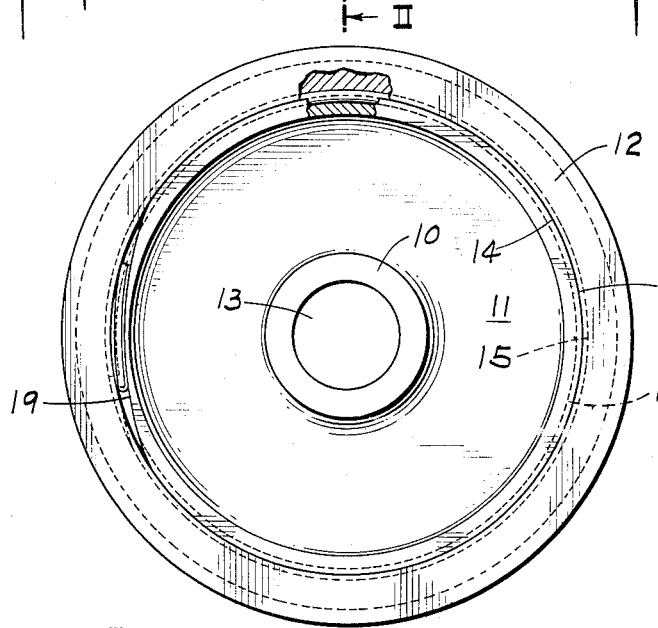
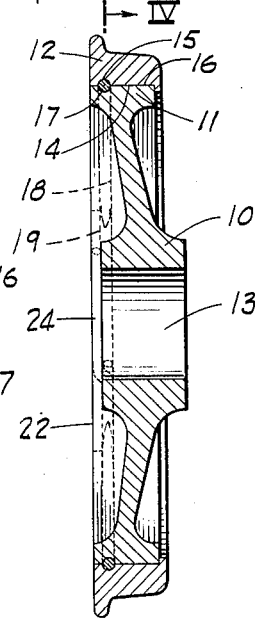
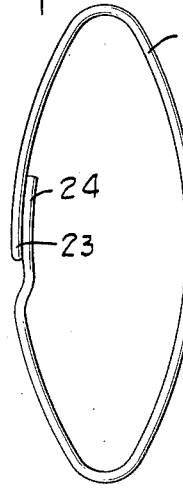
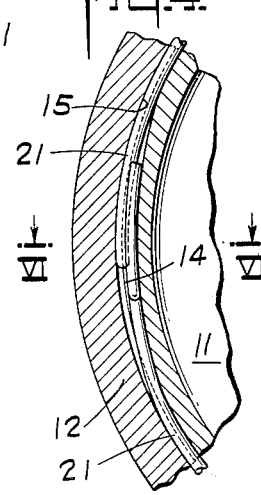
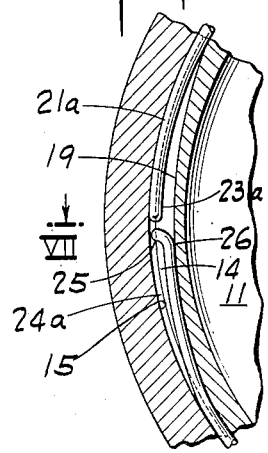
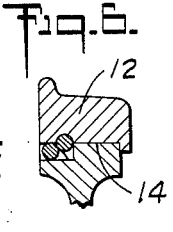
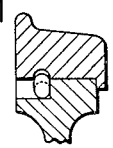
INVENTORS.
HUNTER MICHAELS.
JOHN F. FLECK.
BY Maurice W. Grady
ATTORNEY Patented Sept. 1, 1953

2,650,853

UNITED STATES PATENT OFFICE 2,650,853

RAILWAY CAR WHEEL

Hunter Michaels, New York, N. Y., and John F. Fleck, Youngstown, Pa., assignors to American Locomotive Company, New York, N. Y., a corporation of New York Application November 21, 1950, Serial No. 196,922

3 Claims. (Cl. 295—15)

This invention relates to improvements in car wheels for railway rolling stock.

The principal object of the invention is to provide means for preventing lateral slippage between the tire and center element of a railway car wheel. A further object is to provide a railway car wheel in which the tire and center element have mating grooves in their interfaces to form an annular channel within which means may be disposed to prevent lateral slippage between the tire and center element. Still another object is to provide a railway car wheel so designed that anti-slippage means may be inserted through an opening in the center element and fed endwise into the channel after the tire and center have been assembled and may be thereafter removed therefrom whenever it is desired to disassemble the wheel. In its broader conception, the invention may be designed as means to prevent lateral slippage between rotatable bodies having coacting bearing surfaces such as annular bodies mounted upon shafts.

In the accompanying drawings, Fig. 1 is a side elevation of a wheel with the anti-slippage means in the form of a rod shown in assembled position; Fig. 2 is a vertical section through the wheel and anti-slippage means along the line II—II in Fig. 1; Fig. 3 is a perspective view of one embodiment of anti-slippage means in the form of a rod, the ends of which are adapted to overlap when arranged in assembly; Fig. 4 is a fragment of a section of an assembled wheel taken along the line IV—IV of Fig. 2 with the ends of the anti-slippage means jammed into overlapping relation; Fig. 5 is a fragment of a section of an assembled wheel taken along line V—V of Fig. 2 with an alternative embodiment of anti-slippage means shown as a rod having a tail engaging the rim groove; Fig. 6 is a section view taken along the lines VI—VI of Fig. 4; and Fig. 7 is a section view taken along the lines VII—VII of Fig. 5.

Referring now to the drawings, the invention is shown as applied to a conventional railway car wheel illustrated as comprising a hub 10, a center element or wall 11, a flanged rim 12, and an axle bore 13. The rim may be mounted or fitted upon the center element by any accepted method, since the tightness of the fit is immaterial. The rim may be freely rotatable in reference to the center element or it may be bound thereto by a force fit, by thermal expansion, or by shrinkage, as desired.

The inner curved surface or face 14 of the rim is provided with a groove 15, preferably circular in cross section, which continues completely around the rim. The peripheral surface 16 of wall 11 is also provided with a groove 17 which is disposed opposite groove 15 upon assembly so that the two grooves register to form an annular aperture or channel 18 circular in cross section and extending completely around the wall. Groove 17 is, however, interrupted by cut-out portion 19, as hereinafter more fully described. A heavy wire or curved rod 21 is arranged in the channel, as hereinafter described, and serves to prevent lateral slippage between the rim and wall. Such slippage is likely to occur if the rim becomes loose by accident or as the result of rail hammering or thermal expansion due to brake application.

Wall 11 has a cut-out, crescent shaped, portion 19 on its laterally outer face 22 to permit the insertion of the curved rod into the channel. As best shown in Figs. 6 and 7, the cut-out is dimensioned radially so that rod 21 may be passed therethrough into channel 18. Rod 21 is fabricated so that in its unassembled shape it is substantially annular, although it may have any radius of curvature. Spring steel is a satisfactory material from which the rod may be fabricated, although other steel alloys of sufficient toughness and rigidity will suffice. Rod 21 should have a plain leading end 23 slightly tapered to facilitate its insertion through the cut-out into the channel. It is then pushed endwise into the channel and fed therethrough until it completes the circuit of the channel. In the case of the embodiment shown in Figs. 3 and 4, this will result in the trailing end 24 overlapping the leading end. Sufficient space is provided in the cut-out so that the trailing end may be jammed or forced into tight engagement with the leading end. Further circumferential movement of the rod in the channel is thereby prevented.

In the alternate construction shown in Fig. 5, rod 21a has a trailing end 24a formed with a portion or tail 25 extending radially outward. When the leading end 23a is fed through the channel until it reaches the approximate position of its original insertion, the tail 25 will be thereopposite, although sufficiently ahead of the leading end to clear it circumferentially. The radial dimension from the radially inner side 26 of the rod to the top of the tail 25 will be short enough so that it will be able to clear the rim when positioned at the widest part of the cut-out and pushed laterally into the channel. When pushed laterally through the cut-out into the groove, tail 25 will be sprung radially outward to engage the walls of groove 15 thereby to maintain the rod in the channel.

The removal of the rod from the assembled wheel can be effected easily by the insertion of a prying tool through the cut-out into the space (see Fig. 4) between the rod and face 14. The trailing end can thus be pulled laterally outward from its jammed relation to the leading end. In the case of the second embodiment, the tail 25 can be depressed by inserting the prying tool into the space (see Fig. 5) between the inner face 14 of the rim and the body of the rod adjacent the tail. When tail 25 clears the rim, it can be drawn laterally outward for disassembly.

While there has been hereinbefore described an approved embodiment of this invention, it will be understood that many and various changes and modifications in form, arrangement of parts and details of construction may be made without departing from the spirit of the invention, and that all such changes and modifications as fall within the scope of the appended claims are contemplated as a part of this invention.

What we claim is:

1. In a wheel for a railway vehicle, a center element having a cylindrical periphery, a groove in the periphery, a rim mounted on the center element and having a groove extending completely around the rim, said groove being disposed opposite the first groove to form a channel, and rod means disposed in the channel and extending completely around the center element so that the trailing end of the rod overlaps the leading end thereof, said rod extending radially into both grooves to prevent relative lateral movement between the center element and the rim, and a crescent shaped cut-out portion in the margin of the center element adapted to permit the insertion of the rod means therethrough into the channel so that said rod means may be fed into the channel in endwise manner after the rim and center element have been assembled, the shape of the cut-out portion providing space to permit the overlapping of the rod ends in tight engagement.

2. A wheel for a railway vehicle comprising a hub having an axle bore, a center element extending radially outward from the hub and having a cylindrical periphery, a cut-out portion in the periphery, a groove in the periphery, a rim mounted on the center element and having a groove mating with the first groove to form a channel extending completely around the rim but interrupted by the cut-out portion, and a rod disposed in both grooves of the channel to prevent relative lateral movement between the rim and center element, said rod extending completely around the rim so that its leading and trailing ends are overlapped in the cut-out portion in jammed relation, the cut-out portion having a radial dimension which will permit the insertion of the rod therethrough so that it may be fed into the channel in endwise manner after the rim has been mounted upon the center element and so that it may be later withdrawn therethrough whenever the wheel is disassembled.

3. In a wheel for a railway vehicle, a center element having a cylindrical periphery including a crescent shaped cut-out portion; a groove in the periphery in communication with the cut-out portion; a rim mounted on the center element and having a groove extending completely around the rim, said groove being disposed opposite the first groove to form a channel in communication with said cut-out portion; and a rod disposed in the channel and normally engaging the center element and rim to prevent lateral slippage therebetween, said rod extending completely around the center element so that its ends overlap each other in the cut-out portion in tight engagement with each other.

HUNTER MICHAELS.
JOHN F. FLECK.

References Cited in the file of this patent

UNITED STATES PATENTS

| Number | Name | Date |
|---|---|---|
| 1,176,798 | Ward | Mar. 28, 1916 |
| 1,585,068 | Wright | May 18, 1926 |
| 1,795,821 | Baldwin | Mar. 10, 1931 |
| 2,241,684 | Ware | May 13, 1941 |
| 2,273,620 | Piron | Feb. 17, 1942 |
| 2,316,498 | Biczak | Apr. 13, 1943 |